US006908604B2

(12) United States Patent
Sterte et al.

(10) Patent No.: US 6,908,604 B2
(45) Date of Patent: Jun. 21, 2005

(54) MACROSTRUCTURES OF POROUS INORGANIC MATERIAL AND PROCESS FOR THEIR PREPARATION

(75) Inventors: Per Johan Sterte, Lulea (SE); Lubomira Borislavova Tosheva, Lulea (SE); Valentin Panov Valtchev, Sofia (BG); Svetlana Ivanova Mintova, Sofia (BG)

(73) Assignee: ExxonMobil Chemical Patents Inc., Houston, TX (US)

(*) Notice: Subject to any disclaimer, the term of this patent is extended or adjusted under 35 U.S.C. 154(b) by 20 days.

(21) Appl. No.: 10/117,517

(22) Filed: Apr. 5, 2002

(65) Prior Publication Data

US 2002/0192155 A1 Dec. 19, 2002

Related U.S. Application Data (63) Continuation of application No. 09/315,869, filed on May 20, 1999, now abandoned, which is a continuation-in-part of application No. 09/312,877, filed on May 17, 1999, now Pat. No. 6,569,400.

(51) Int. Cl.$^7$ .......................... C01B 26/36; C01B 33/12; C01B 33/26; C01B 33/36; C01B 39/02
(52) U.S. Cl. .................... 423/716; 423/709; 423/328.1; 423/328.2; 423/335; 423/305; 423/628; 501/81; 502/60; 502/62; 502/159
(58) Field of Search .............................. 501/80, 81, 82, 501/153, 154; 502/60, 62, 159; 423/700, 709, 716, 328.1, 328.2, 335, 339, 305, 306, 625, 628

(56) References Cited

U.S. PATENT DOCUMENTS

| 4,116,858 A | * | 9/1978 | Lee et al. .................... 252/184 |
| 4,127,240 A | * | 11/1978 | Kell .......................... 242/384.4 |
| 4,217,240 A | | 8/1980 | Bergna ........................ 252/313 |

(Continued)

FOREIGN PATENT DOCUMENTS

| EP | 103035 A | * | 3/1984 | |
| EP | 260826 A | * | 3/1984 | |
| EP | 201264 A | * | 12/1986 | |
| EP | 217143 A | * | 4/1987 | ............ B01J/20/00 |
| EP | 878233 A | * | 11/1998 | |
| WO | WO 8203571 A | * | 10/1982 | ............ B01J/29/06 |
| WO | WO 9009235 A | * | 8/1990 | ............ B01J/20/18 |
| WO | WO 90/09235 | | 8/1990 | ............ B01J/20/18 |
| WO | WO-9405597 A | * | 3/1994 | |
| WO | WO 94/05597 | | 3/1994 | ............ C01B/33/26 |
| WO | WO-9425151 A | * | 11/1994 | |
| WO | WO-9425152 A | * | 11/1994 | |
| WO | WO-9529751 A | * | 11/1995 | |
| WO | WO 96/07713 | | 3/1996 | ............ C01G/67/00 |

OTHER PUBLICATIONS

Utracki et al., Multiphase Polymers: Blends and Ionomers, Chapter 16, Mauritz et al., "Perfluorinated–Ionomer–Membrane–Based Microcomposites," pp. 401–417, 1989.*
U.S. Appl. No. 09/574,432, filed May 20, 2000, Mohr et al.
U.S. Appl. No. 09/574,433, filed May 20, 2000, Mohr et al.

*Primary Examiner*—David Sample (57) ABSTRACT

There is provided macrostructures of porous inorganic material which can have controlled size, shape, and/or porosity and a process for preparing the macrostructures. The macrostructures comprise a three-dimension network of particles of porous inorganic materials. The process for preparing the macrostructures involves forming an admixture containing a porous organic ion exchanger and a synthesis mixture capable of forming the porous inorganic material and then converting the synthesis mixture to the porous inorganic material. After formation of the composite material, the porous organic ion exchanger can be removed from the composite material to obtain the macrostructures.

29 Claims, 4 Drawing Sheets

U.S. PATENT DOCUMENTS

| | | | | |
|---|---|---|---|---|
| 4,337,171 A | * | 6/1982 | Kulprathipanja et al. | 127/46.3 |
| 4,670,303 A | * | 6/1987 | Miles | 424/450 |
| 4,680,170 A | * | 7/1987 | Lowe et al. | 423/277 |
| 5,399,535 A | * | 3/1995 | Whitman | 423/335 |
| 5,863,516 A | * | 1/1999 | Otterstedt et al. | 423/700 |
| 5,863,519 A | | 1/1999 | Golman et al. | 424/9.36 |
| 5,916,837 A | * | 6/1999 | Harmer et al. | 502/151 |
| 6,241,960 B1 | * | 6/2001 | Tops.o slashed.e et al. | 423/305 |

* cited by examiner

MACROSTRUCTURES OF POROUS INORGANIC MATERIAL AND PROCESS FOR THEIR PREPARATION

CROSS-REFERENCE TO RELATED APPLICATION

This application is a continuation of application Ser. No. 09/315,869 filed May 20, 1999, now abandoned, which is a continuation-in-part of application Ser. No. 09/312,877, filed May 17, 1999, now U.S. Pat. No. 6,569,400.

FIELD OF THE INVENTION

The present invention concerns macrostructures of mesoporous inorganic material and microporous inorganic material which can have controlled size, shape, and/or porosity and a process for production of the macrostructures.

BACKGROUND OF THE INVENTION

Both mesoporous inorganic material and microporous inorganic material are characterized by a large specific surface area in pores and are used in a large number of applications of considerable commercial importance. The terms "porous inorganic material" and "porous material", as used herein, includes mesoporous inorganic material, microporous inorganic material, and mixtures thereof.

In most of the applications using porous inorganic material, the fact that the phase interface between the solid porous material and the medium (liquid or gas) in which it is used is large can be very important. Heterogeneous phase catalysts used in refinery processes, petrochemical conversion processes, and different environmentally related applications often comprise porous inorganic material, especially microporous material. Adsorbents for the selective adsorption in the gas or liquid phase or the selective separation of ionic compounds are often porous inorganic material. In addition to these applications, porous inorganic materials have recently become increasingly utilized in a number of more technologically advanced areas. Examples of such uses include use in chemical sensors, in fuel cells and batteries, in membranes for separation or catalytic purposes, during chromatography for preparative or analytical purposes, in electronics and optics, and in the production of different types of composites.

Although a large phase interface is often a fundamental requirement for use of porous materials in different applications, a number of additional requirements related to the specific area of application are imposed on these materials. For example, the large phase interface available in the pores of the porous organic material must be accessible and useable. Therefore, the porosity, pore size and pore size distribution in large pores (meso- and macropores) are often of major significance, especially when mass transport affects process performance. The surface properties of the porous material can also be very important for the performance of the material in a given application. In this context, the purity of the material is also significant. In most applications, size and shape of porous macrostructures containing the porous inorganic material and the degree of variation of these properties are very important. During use, the size and shape of the porous macrostructures can influence properties like mass transport within the porous structures, pressure drop over a bed of particles of the material, and the mechanical and thermal strength of the material. The factors that are the most important will vary depending on the application in which the macrostructures are used as well as the configuration of the process in which the application occurs. Techniques that permit production of a material with increased specific surface area, pore structure (pore size/pore size distribution), chemical composition, mechanical and thermal strength, as well as increased and uniform size and shape, are consequently required to tailor porous inorganic macrostructures to different applications.

Mesoporous inorganic materials include amorphous metal oxide (non-crystalline) materials which have mesoporous and optionally partially microporous structure. The pore size of the mesoporous inorganic material is usually in the range of from about 20 Å to about 500 Å.

Microporous inorganic materials include crystalline molecular sieves. Molecular sieves are characterized by the fact that they are microporous materials with pores of a well-defined size in the range of from about 2 Å to about 20 Å. Most molecules, whether in the gas or liquid phase, both inorganic and organic, have dimensions that fall within this range at room temperature. Selecting a molecular sieve with a suitable pore size therefore allows separation of a molecule from a mixture through selective adsorption, hence the name "molecular sieve". Apart from the selective adsorption and selective separation of uncharged seeds, the well-defined pore system of the molecular sieve enables selective ion exchange of charged seeds and selective catalysis. In the latter two cases, significant properties other than the micropore structure include, for instance, ion exchange capacity, specific surface area and acidity.

Molecular sieves can be classified into various categories such as by their chemical composition and their structural properties. A group of molecular sieves of commercial interest is the group comprising the zeolites, that are defined as crystalline aluminosilicates. Another group is that of the metal silicates, structurally analogous to zeolites, but for the fact that they are substantially free of aluminum (or contain only very small amounts thereof). Still another group of molecular sieves are ALPO-based molecular sieves which contain framework tetrahedral units of alumina ($AlO_2$) and phosphorous oxide ($PO_2$) and, optionally, silica ($SiO_2$). Examples of such molecular sieves include SAPO, ALPO, MeAPO, MeAPSO, ELAPO, and ELAPSO.

A summary of the prior art, in terms of production, modification and characterization of molecular sieves, is described in the book Molecular Sieves—Principles of Synthesis and Identification (R. Szostak, Blackie Academic & Professional, London, 1998, Second Edition). In addition to molecular sieves, amorphous materials, chiefly silica, aluminum silicate and aluminum oxide, have been used as adsorbents and catalyst supports. A number of long-known techniques, like spray drying, prilling, pelletizing and extrusion, have been and are being used to produce macrostructures in the form of, for example, spherical particles, extrudates, pellets and tablets of both micropores and other types of porous materials for use in catalysis, adsorption and ion exchange. A summary of these techniques is described in Catalyst Manufacture, A. B. Stiles and T. A. Koch, Marcel Dekker, New York, 1995.

Because of limited possibilities with the known techniques, considerable investment has been made to find new ways to produce macrostructures of porous inorganic materials, with a certain emphasis on those in the form of films.

PCT Publication WO 94/25151 involves the production of films of molecular sieves by a process in which seed crystals of molecular sieves are deposited on a substrate surface and then made to grow together into a continuous film. PCT Publication WO 94/25152 involves the production of films of molecular sieves by introduction of a substrate to a synthesis solution adjusted for zeolite crystallization and crystallization with a gradual increase in synthesis temperature. PCT Publication WO 94/05597 involves the production of colloidal suspensions of identical microparticles of molecular sieves with an average size below 200 nm. PCT Publication WO 90/09235 involves method for production of an adsorbent material in the form of a monolith by impregnation of the monolithic cell structure with a hydrophobic molecular sieve, followed by partial sintering of the molecular sieve with the material from which the cell structure is constructed.

Although a number of different techniques already exist for production of porous inorganic macrostructures with the desired size and shape, these techniques have a number of limitations that can affect the properties and performance of the macrostructures during their use. Most of these techniques require the use of a binder to give the macrostructure acceptable mechanical strength. The presence of the binder can adversely affect certain desired properties, such as high specific surface area and uniform chemical composition. Also, most of the existing binding techniques constrain the ability to tailor the macrostructure in size and shape within narrow limits. If a well defined size is desired with a narrow particle size distribution, it is many times necessary and most often required, to separate desirable and undesirable macrostructures, which can lead to considerable waste during manufacture. The use of different types of binders can also affect the pore structure in the macrostructures and it is often necessary to find a compromise between mechanical properties and pore size. It is often desirable to have a bimodal pore size distribution in the macrostructures of the porous materials, in which the micropores maintain a large specific phase interface, whereas the larger pores in the meso- or macropore range permit transport of molecules to the surface and, in this way, prevent diffusion limitations. During production of macrostructures using known techniques, a secondary system of pores within the meso- and/or macropore range can be produced by admixing a particulate inorganic material or by admixing organic material (for example, cellulose fibers), which are later eliminated by calcining. Both of these techniques, however, often produce an adverse effect on the other properties of the resulting material.

The present invention provides a process for the production of macrostructures of porous inorganic materials with controlled size, shape and porosity in which it is possible to overcome or at least mitigate one or more of the above-described problems.

SUMMARY OF THE INVENTION

One purpose of the present invention is to reduce or eliminate the drawbacks in the known methods for production of macrostructures with a new process that permits production of these macrostructures without addition of binders and with a uniform final composition. Another purpose of the present invention is to provide a process, according to which the final shape, size and size distribution of the macrostructure can be controlled. Still another purpose of the present invention is to provide a process according to which both the pore structure of the material and a secondary system of larger pores can be controlled. A further purpose of the present invention is to provide a process for production of macrostructures of porous material with good mechanical and thermal stability.

In accordance with the present invention, there is provided composite material comprising a porous organic ion exchanger and a continuous three-dimensional matrix of porous inorganic material which is present in the three-dimensional pore structure of the porous ion organic ion exchanger. Removal of the porous ion organic ion exchanger from the composite material results in macrostructures having good mechanical strength and stability.

In another embodiment, there is provided macrostructures of porous inorganic material which can have controlled size, shape and porosity and comprise a three-dimensional network of particles of porous inorganic material.

In another embodiment, there is provided a process for preparing macrostructures of porous inorganic material with controlled size, shape and porosity. The process involves first producing composite material from an admixture containing a porous organic ion exchanger and a synthesis mixture capable of forming the porous inorganic material. The production of the composite material is carried out by converting the synthesis mixture to the porous inorganic material. Usually, the conversion of the synthesis mixture to the porous inorganic material is carried out under hydrothermal conditions. After formation of the composite material, the porous organic ion exchanger can be removed from the composite material to obtain the macrostructures.

DETAILED DESCRIPTION OF THE INVENTION

The process of the present invention for preparing of macrostructures of porous organic material preferably comprises the following steps:

(a) forming a admixture comprising a porous organic ion exchanger and a synthesis mixture capable of forming said porous inorganic material and which occupies at least a portion of the pore space of the porous organic ion exchanger;

(b) converting said synthesis mixture within the pore space of said porous inorganic ion exchanger under hydrothermal conditions to form said porous inorganic material; and, (c) removing said porous organic ion exchanger.

The porous organic ion exchanger can be removed using techniques know to persons skilled in the art. Examples of such techniques include oxidation processes such as calcination, and chemical removal such as by chemical destruction or chemical dissolution. Usually, the removal of the porous organic ion exchanger will result in macrostructures with the size and shape of the employed organic ion exchanger.

Macrostructures refer to structures with a size that exceeds 0.01 mm in at least one dimension, preferably 0.1 mm and, more preferably, 1.0 mm. Examples of macrostructures are spherical particles, cylindrical extrudates, pellets, fibers, thin films applied to different forms of substrates and other composites, in which the porous material is combined with other types of material.

The term "average particle size" as used herein, means the arithmetic average of the diameter distribution of the particles on a volume basis.

The macrostructure will be porous and will comprise a three-dimensional matrix of particles of porous inorganic oxide. Usually, the particles will occupy less than 75% of the volume of the macrostructures. Preferably, the particles will have an average particle size of less than 500 nm. The particles will be joined together and can even be intergrown. More preferably, the particles will have an average particle size of less than 200 nm, e.g., 100 nm and will occupy less than 50% of the total volume of the macrostructure.

Porous inorganic materials that find particular application include crystalline molecular sieves and mesoporous materials. Examples of mesoporous material that find particular application include amorphous silica, amorphous alumina, and amorphous aluminosilicates. For some applications, it is preferable that the pore size of the mesoporous inorganic material be in the range of from about 20 Å to about 50 Å.

Molecular sieves produced by the process of the invention include silicates, metallosilicates such as aluminosilicates and gallosilicates, and ALPO-based molecular sieves such as alumino-phosphates (ALPO), silicoaluminophosphates (SAPO), metalloalumino-phosphates (MeAPO), and metalloaluminophosphosilicate (MeAPSO). Some of these molecular sieves, while not being true zeolites, are frequently referred to in the literature as such, and this term will be used broadly below.

Molecular sieves/zeolites that find application in the present invention include any of the naturally occurring or synthetic crystalline molecular sieves. Examples of these zeolites include large pore zeolites, intermediate pore size zeolites, and small pore zeolites. These zeolites and their isotypes are described in "Atlas of Zeolite Structure Types", eds. W. H. Meier, D. H. Olson and Ch. Baerlocher, Elsevier, Fourth Edition, 1996, which is hereby incorporated by reference. A large pore zeolite generally has a pore size of at least about 7 Å and includes LTL, VFI, MAZ, MEI, FAU, EMT, OFF, *BEA, and MOR structure type zeolites (IUPAC Commission of Zeolite Nomenclature). Examples of large pore zeolites include mazzite, offretite, zeolite L, VPI-5, zeolite Y, zeolite X, omega, Beta, ZSM-3, ZSM-4, ZSM-18, ZSM-20, SAPO-37, and MCM-22. An intermediate pore size zeolite generally has a pore size from about 5 Å to about 7 Å and includes, for example, MFI, MEL, MTW, EUO, MTT, MFS, AEL, AFO, HEU, FER, and TON structure type zeolites (IUPAC Commission of Zeolite Nomenclature). Examples of intermediate pore size zeolites include ZSM-5, ZSM-11, ZSM-12, ZSM-22, ZSM-23, ZSM-34, ZSM-35, ZSM-385, ZSM-48, ZSM-50, ZSM57, silicalite 1, and silicalite 2. A small pore size zeolite has a pore size from about 3 Å to about 5.0 Å and includes, for example, CHA, ERI, KFI, LEV, SOD, and LTA structure type zeolites (IUPAC Commission of Zeolite Nomenclature). Examples of small pore zeolites include ZK-4, ZSM-2, SAPO-34, SAPO-35, ZK-14, SAPO-42, ZK-21, ZK-22, ZK-5, ZK-20, zeolite A, hydroxysodalite, erionite, chabazite, zeolite T, gemlinite, ALPO-17, and clinoptilolite.

The preferred molecular sieve/zeolite will depend on its use There are many known ways to tailor the properties of the molecular sieves, for example, structure type, chemical composition, ion-exchange, and activation procedures. Macrostructures comprised of molecular sieve particles do not require the presence of significant amounts of amorphous materials to bind together the molecular sieve particles. Thus, macrostructures comprised of the molecular sieve particles can contain less than 10% by weight of amorphous binder material based on the weight of the microstructures. For many applications, these macrostructures will contain even lesser amounts of amorphous binder, e.g., 5% by weight or even less, e.g., the macrostructures can be substantially free of amorphous binder.

When the molecular sieve produced is an crystalline metallosilicate, the chemical formula of anhydrous crystalline metallosilicate can be expressed in terms of moles as represented by the formula: $M_2/nO:W_2O_3:ZSiO_2$, wherein M is selected from the group consisting of hydrogen, hydrogen precursors, monovalent, divalent, and trivalent cations and mixtures thereof; n is the valence of the cation and Z is a number of at least 2, preferably at least 3, said value being dependent upon the particular type of molecular sieve, and W is a metal in the anionic framework structure of the molecular sieve such as aluminum, gallium, boron, or iron.

When the molecular sieve produced has an intermediate pore size, the molecular sieve preferably comprises a composition having the following molar relationship:

$$X_2O_3:(n)YO_2,$$

wherein X is a trivalent element, such as aluminum, gallium, zinc, iron, and/or boron, Y is a tetravalent element such as silicon, tin, and/or germanium; and n has a value greater than 10, usually from about 20 to less than 20,000, more usually from 50 to 2,000, said value being dependent upon the particular type of molecular sieve and the trivalent element present in the molecular sieve.

When the molecular sieve is a gallosilicate intermediate pore size molecular sieve, the molecular sieve preferably comprises a composition having the following molar relationship:

$$Ga_2O_3:ySiO_2$$

wherein y is between about 20 and about 500, typically from 20 to 200. The molecular sieve framework may contain only gallium and silicon atoms or may also contain a combination of gallium, aluminum, and silicon.

The composition of the synthesis mixture will vary according to the porous inorganic material to be produced. For example, in making silicalite 1 or silicalite 2, the aqueous synthesis mixture will contain a source of silicon, and will usually contain a structure directing agent. When preparing an aluminosilicate zeolite, the aqueous synthesis mixture will contain sources of silica and alumina and will usually contain a structure directing agent. When the porous inorganic material to be produced is an ALPO-based molecular sieve, the aqueous synthesis mixture will contain sources of aluminum and phosphorus, optionally silicon and will usually contain a structure directing agent.

For the manufacture of a MFI structure type zeolite, especially ZSM-5 or silicalite 1, the synthesis mixture is advantageously of a molar composition, calculated in terms of oxides, within the following ranges:

| | |
|---|---|
| $M_2O:SiO_2$ | 0 to 0.7 to :1 preferably 0.016 to 0.350:1 |
| $SiO_2:Al_2O_3$ | 12 to infinity :1 |
| $(TPA)_2O:SiO_2$ | 0 to 0.2:1 preferably 0 to 0.075:1 |
| $H_2O:SiO_2$ | 7 to 1000:1 preferably 9 to 300:1 | wherein TPA represents tetrapropylammonium and M is an alkali metal, preferably sodium or potassium, also Li, Cs and ammonia. Other template agents may be used in these ratios.

The organic ionic exchangers used in the present invention refers to organic porous materials with a surface charge and ion exchange capacity for anions or cations. Preferably, the organic ionic exchangers are polymer-based which are sometimes referred to as ion exchange resins. Polymer-based ionic exchangers are commercially available or can be readily prepared from resins that are commercially available. Examples of such resins include resins sold by Rohm and Haas Company under the registered trademark Amberlyst and resins sold by the Dow Chemical Company under the registered trademark Dowex. These exchangers cover a broad spectrum of different cation and anion exchangers with varying ion exchange capacity, porosity, pore size and particle size. Ion exchangers with an apparent anion exchange capacity, typically greater than about 1 meq/gm of dry anion exchanger, are of special interest to the present invention. Macroreticular organic ionic exchangers are particularly preferred in the practice of the present invention. By "macroreticular" as the term is commonly used in the resin art, it is generally meant that the pores, voids, or reticules are substantially within the range of about 200 to about 2,000 Å. Macroreticular resins are also referred to as macroporous resins.

A preferred group of ion exchangers suitable for use in the process of the present invention are anion exchange resins comprising water-insoluble polymeric resins having attached thereto a plurality of active anion exchange sites. The resin generally contains sufficient of such active ion exchange groups to impart thereto a concentration of ion exchange sites in the range from about 0.5 to about 12 meq/gram dry resin, typically greater than 1 meq/gram, and in some cases, preferably from about 4 to about 5.5 meq/gram of dry resin.

Anion-exchange resins are characterized as either strong base or weak base anion-exchange resins depending on the active ion-exchange sites of the resin. Strong base anion-exchange resins consist of polymers having mobile monovalent anions, such as hydroxide and the like associated for example with covalently bonded quaternary ammonium, phosphonium or arsonium functional groups or tertiary sulfonium functional groups. These functional groups are known as active sites and are distributed over the surface of the resin particle. Strong base anion-exchange resins have the capacity to undergo ion exchange independent of the pH of the medium by virtue of their intrinsic ionic character. Macroreticular strong base anion-exchange resins in the hydroxide form are particularly preferred in the practice of the present invention.

The resin matrix of weak base anion-exchange resins contains chemically bonded thereto a basic, nonionic functional group. The functional groups include primary, secondary, or tertiary amine groups. These may be aliphatic, aromatic, heterocyclic or cycloalkane amine groups. They may also be diamine, triamine, or alkanolamine groups. The amines, for example, may include alpha, alpha'-dipyridyl, guanidine, and dicyanodiamidine groups. Other nitrogen-containing basic, non-ionic functional groups include nitrile, cyanate, isocyanate, thiocyanate, isothiocyanate, and isocyanide groups. Pyridine groups may also be employed.

Ion exchangers of the strongly basic type which contain quaternary ammonium groups, have been found to be particularly suited for use in the present invention. Commercially available ion exchangers are generally in the form of spherical particles with a relatively narrow particle size distribution. Organic ion exchangers with a size and shape other than spherical, for example, fibers or flakes, however, can be produced according to known techniques. It is also known that films of organic ion exchangers can be deposited on different forms of substrates.

The term "seeds" refers to particles, e.g., crystallites, of porous inorganic material, e.g., molecular sieves, that are capable of initiating crystallization of the desired porous inorganic material. The seeds, which can be present in the synthesis mixture before its synthesis, e.g., seeds can be added to the synthesis mixture, or can be formed in situ usually in the early stage of synthesis of the porous inorganic material and are characterized by the fact that by treatment in of the synthesis mixture with appropriate concentration and under suitable conditions, the seeds can be made to grow and form a continuous structure in the pore system of the ion exchanger. Examples of such seeds includes silicate seeds, metal silicate seeds such as aluminosilicate, borosilicate, gallosilicate, and iron silicate seeds, SAPO seeds, and ALPO seeds. Preferred seeds include olgomeric anions of silicates and metal silicates. The term "seeds" also includes microcrystals of porous inorganic material, e.g., crystals of molecular sieves with a size below 500 nm, e.g., 200 nm, and whose crystal structure can be identified by X-ray diffraction. Microcrystals of molecular sieves suitable for use in the process of the present invention are disclosed in U.S. Pat. No. 5,863,516, which is hereby incorporated by reference.

Although the invention is not intended to be limited to any theory of operation, it is believed that one of the advantages of the present invention is that the surface of the porous organic ion exchanger can facilitate nucleation of the synthesis mixture resulting in the formation of seeds which can subsequently grow into a porous inorganic matrix. In line with this theory, it is believed that the surface charge of the porous organic ion exchanger can attract seeds or seed forming material onto the surface of the porous the ion exchanger. For example, anion exchange resins, which have a positive charge, can attract negatively charged seeds such as silicate seeds, metal silicate seeds and aluminosilicate seeds.

In a second phase in production of porous macrostructures according to the invention, the seeds formed on or bonded to the surface in the organic ion exchanger are made to grow such as by hydrothermal treatment in an appropriate synthesis solution. Through this growth a continuous three-dimensional network of porous material is formed in the pore structure of the employed ion exchange structure. After this stage, the product is a composite material comprising two continuous three-dimensional networks, one comprising the polymer structure of the ion exchanger, and the second comprising the formed inorganic porous material. Introduction of seeds can be carried out physically in a separate stage, with a subsequent growth stage under appropriate conditions in a synthesis solution. However, it is also possible and often advantageous not to separate these stages, but instead to directly introduce the ion exchanger material into a synthesis solution and expose this to hydrothermal conditions, during which seeds are formed in or ion-exchanged from the synthesis solution to the ion exchanger, to then grow the material into a continuous structure.

Molecular sieves are generally produced by hydrothermal treatment of a silicate solution with synthesis mixture. Hydrothermal treatment refers to treatment in aqueous solution or aqueous suspension at a temperature exceeding 50° C., preferably exceeding 80° C. and, in most cases, exceeding 95° C. In some instances, it is preferable to carry out the hydrothermal treatment first at a lower temperature and then at a higher temperature. In the synthesis of some of the microporous molecular sieves, e.g., silicalite 1, the crystallinity can be increased when the hydrothermal treatment is carried out at in two steps. In the initial step, the temperature is lower, e.g., 90–110° C., than the second step, e.g., 150–165° C.

The composition of the synthesis mixture and the synthesis parameters, like temperature, time and pressure, can effect the product obtained as well as the size and shape of the formed crystals. This applies both in syntheses, in which the final product is deposited as crystals in the porous structure of an ion exchanger, and in conventional synthesis, when the final crystal size is most often much larger. The material deposited in the pore system of the ion exchanger is therefore dependent on the composition of the synthesis mixture and the synthesis conditions. During crystallization of macrostructures of a given molecular sieve according to the present invention, it is sometimes desirable to use synthesis mixtures, which, in the absence of ion exchanger material, result in colloidal suspensions of the desired molecular sieve. In some instances, the ion exchanger material can influence the result of the synthesis.

The composite of ion exchanger and porous inorganic material obtained after this process can be of interest by itself in certain commercial applications. However, for most potential areas of application it is advantageous to eliminate the organic ion exchanger from the composite. This can occur after formation of the porous inorganic material, which leaves behind only the porous material with a secondary pore system with a porosity and pore size caused by the structure of the employed organic ion exchanger. Removal of the organic ion exchanger preferably occurs by calcining at a temperature exceeding 400° C. The calcination can take place in the presence of acid, in which this material is burned to mostly carbon dioxide and water. As an alternative, the organic material can be removed by selective dissolution with a solvent that dissolves the ion exchanger, but not the inorganic material, or with selective decomposition of the inorganic material by means of a chemical reaction other than by an oxidation reaction.

After removal of the ion exchanger, the resulting inorganic macrostructure is usually a replica in size and shape of the organic ion exchanger present in the admixture. This means that the possibilities for controlling the size, shape and meso/macroporosity in the inorganic porous material are largely determined by the possibilities of structural manipulation of the properties of the ion exchanger. The secondary pore structure of the macrostructure will be revealed following removal of the organic ion exchanger material. The macrostructure however, can be further treated after removal from the ion exchanger by deposition of porous organic materials, e.g., molecular sieves such as silicalite 1 and silicalite 2. Upon depositing the inorganic material, the secondary pore structure can be more or less sealed and, in the extreme case, leave behind a homogeneous porous material (without porosity in the meso/macropore range). This could be of interest, for example, in the production of thin films of porous structures, for use in applications, like membranes for catalyst or separation purposes, or in chemical sensors. It is also possible, according to a known technique, to coat the surface of the macrostructures of a given type of porous material produced according to the invention with a thin film of another type of material, something that could be of interest in a catalytic context or during use of macrostructures for controlled dosage of drugs or pesticides.

The porous inorganic material prepared by the process of the present invention can be treated to provide a more acidic form or to replace at least in part the original metals present in the materials with a different cation, e.g., a Group IB to VIII Periodic Table metal such as nickel, copper, zinc, palladium, platinum, calcium or rare earth metal.

EXAMPLES

In the examples, the resulting products were evaluated by a scanning electron microscope (SEM), X-ray diffractometry (XRD), spectroscopy and by measurements of the specific surface area and pore size distribution with krypton or nitrogen adsorption.

Scanning electron microscope studies were conducted on samples coated with gold (by a sputtering technique). A scanning electron microscope of the Philips XL 30 type with a Lanthanum hexa-Boride emission source was used in these studies.

X-ray diffraction studies were conducted with a Siemens D-5000 powder diffractometer.

Nitrogen adsorption measurements to determine specific surface area and particle size distribution were carried out with an ASAP 2010 from Micromeritics Instruments, Inc.

Elemental analysis concerning carbon, nitrogen and hydrogen was carried out on certain samples by means of an analytical instrument from LECO Corporation (LECO CHN-600). The particle size and particle size distribution for the colloidal suspensions of discrete microcrystals of molecular sieves used as starting material according to the process were determined by dynamic light scattering (ZetaPlus, Brookhaven Instruments).

EXAMPLE 1

Macrostructures comprising spherical particles of porous amorphous silica with very high specific surface area were prepared as follows:

A synthesis solution with the following composition (on a molar basis): $9TPAOH:25SiO_2:480H_2O:100EtOH$ (TPAOH representing tetrapropylammonium hydroxide and EtOH representing ethanol) was prepared by mixing 20.0 grams of tetraethoxysilane (>98%), 34.56 grams of tetrapropylammonium hydroxide (1.0M solution) and 5.65 grams of distilled water. The mixture was allowed to hydrolyze in a polyethylene flask on a shaking table for 12 hours at room temperature. An amount of 1.0 grams of a strongly basic anion exchange resin sold under the tradename Dowex 1X2-100 type and manufactured by the Dow Chemical Company was added to 10 grams of the synthesis solution. The anion exchange resin was present as spherical particles with a particle size range of 50–100 mesh (dry) and the ion exchange capacity of the resin was specified by the manufacturer to be 3.5 mEq/g.

The mixture of ion exchanger and synthesis solution was heated in a polyethylene reactor equipped with a reflux condenser in an oil bath at 100° C. for 48 hours. After this time, the ion exchanger resin particles were separated from the solution by filtration and treated in a 0.1M ammonia solution in an ultrasound bath for 15 minutes and then separated from the ammonia solution by filtration. Next, the particles were washed three times by suspension in distilled water, followed by separation by filtration, and then dried in a heating cabinet at 60° C. for 12 hours. Next, the particles were calcined at 600° C. in air for 4 hours, after heating to this temperature at a rate of 10° C./min.

The resulting material consisted of hard, solid, white spherical particles with a size distribution identical to that in the employed ion exchanger. Elemental analysis showed that the particles were almost entirely free of carbon, hydrogen and nitrogen, which showed that the ion exchanger had been completely eliminated in the calcining stage.

Figure 1:
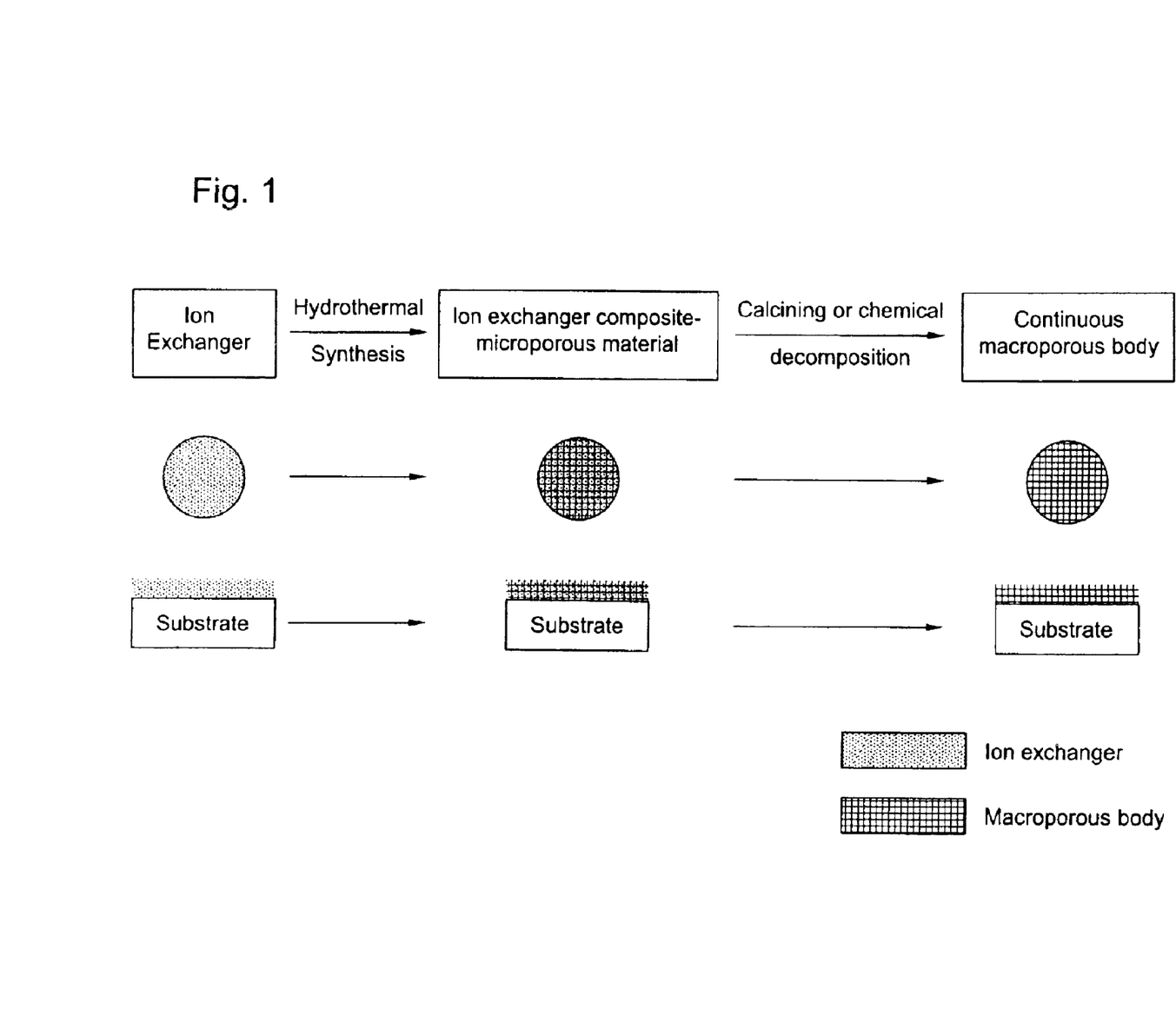
FIG. 1 represents a schematic description of the different stages in production of spherical particles or thin films of porous organic material according to the invention.
Figure 2:
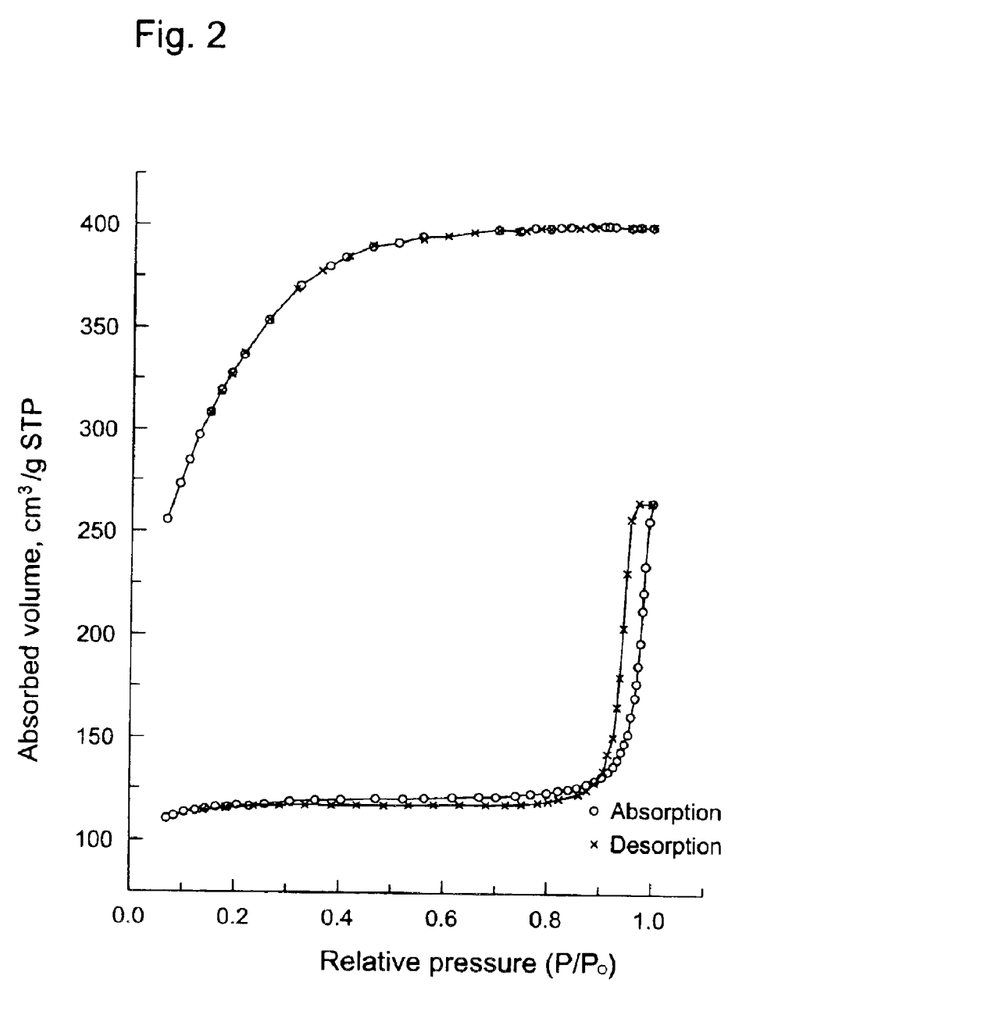
FIG. 2 represents adsorption-desorption isotherms measured for spherical particles of amorphous silica of Examples 1 and 2.

X-ray diffractometry also showed that the material was completely amorphous. The particles were also analyzed by nitrogen adsorption measurements at the boiling point of nitrogen to determine the specific surface area, the adsorption isotherm and pore size distribution of the porous amorphous silica. The specific surface area was calculated from the adsorption data according to the BET equation as 1220 m$^2$/g. The recorded isotherm is shown in FIG. 2 and was of type I, which is typical of porous materials. Calculation of the pore size distribution by the BJH method (desorption isotherm) showed that a very small fraction (about 20 m$^2$/g) of the total specific surface area of the material was found in pores in the mesopore range (diameter >20 Å). The average pore diameter was calculated at 9.5 Å by the Horvath-Kawazoes method.

EXAMPLE 2

Macrostructures comprising spherical particles of amorphous aluminum silicate with high specific surface area in pores in both the micro- and mesopore range were prepared as follows:

25 grams of a synthesis solution with the molar composition: 2.4Na$_2$O:1.0TEACl:0.4Al$_2$O$_3$:10SiO$_2$:/460H$_2$O (TEACl representing tetraethylammonium chloride) were added to 2.0 grams of a strongly basic ion exchanger sold under the tradename Dowex MSA-1 and manufactured by the Dow Chemical Company (particle size 20–50 mesh and [dry] ion exchange capacity of 4 mEq/g) in a polyethylene reactor. The synthesis mixture was prepared by first dissolving 0.75 grams sodium aluminate (50.6 wt % Al$_2$O$_3$, 36 wt % Na$_2$O) in 35 grams of a 1M NaOH solution at 100° C. This solution was then added to a mixture of 40 grams distilled water, 1.66 grams TEACl and 15 grams silica sol (Bindzil 40/130, Eka Chemicals AB, solids content 41.36 wt %, 0.256 wt % Na$_2$O) during agitation for 2 hours. The mixture of ion exchanger and synthesis solution was treated in a polyethylene reactor equipped with a reflux condenser in an oil bath at 100° C. for 48 hours. After this time, the ion exchanger particles were separated from the solution by filtration and treated in a 0.1M ammonia solution in an ultrasound bath for 15 minutes and then separated from the ammonia solution by filtration. The particles were finally washed three times by suspension in distilled water, followed by separation by filtration, and then dried in a heating cabinet at 60° C. for hours. Next, the particles were calcined at 600° C. in air for 4 hours, after heating to this temperature at a rate of 10° C./min.

Visual inspection and analysis with a scanning electron microscope showed that the resulting material consisted of very hard, solid, white spherical particles with size distribution identical to that in the employed ion exchanger. Elemental analysis showed that the particles were almost entirely free of carbon, hydrogen and nitrogen, which showed that the ion exchanger material had been completely eliminated in the calcining stage.

X-ray diffractometry showed that the material was completely amorphous. The particles were further analyzed by nitrogen adsorption measurements at the boiling point of nitrogen to determine the specific surface area, adsorption isotherms and pore size distribution. The specific surface area was calculated from the adsorption data according to the BET equation as 594 m$^2$/g. The recorded isotherm is shown in Example 2 and was of type IV. Calculation of the pore size distribution by the BJH method (desorption isotherm) showed that a relatively large percentage of the total (cumulative) pore volume (about 65%) was found in pores in the mesopore range (radius >20 Å).

EXAMPLE 3

Macrostructures comprising spherical particles of Silicalite 1 were prepared as follows:

14.3 grams of a synthesis solution with the molar composition: 9TPAOH:25SiO$_2$:480H$_2$O:100EtOH were added to 1.0 grams of a macroporous strongly basic ion exchanger sold under the tradename Dowex MSA-1 and manufactured by the Dow Chemical Company (particle size 20–50 mesh [dry]; ion exchange capacity: 4 mEq/g). The synthesis mixture was prepared as described in Example 1. The mixture of ion exchanger and synthesis solution was heated in a polyethylene reactor equipped with a reflux condenser in an oil bath at 100° C. for 48 hours. After this time, the ion exchanger particles were separated from the solution and the material was crystallized in the bulk phase by filtration and treated in a 0.1M ammonia solution in an ultrasound bath for 15 minutes, whereupon they were separated again by filtration. Next, the particles were washed three times by suspension in distilled water, followed by separation by filtration, and then dried in a heating cabinet at 60° C. for 12 hours. Next, the particles were calcined at 600° C. in air for 10 hours, after heating to this temperature at a rate of 1° C./min.

Figure 3:
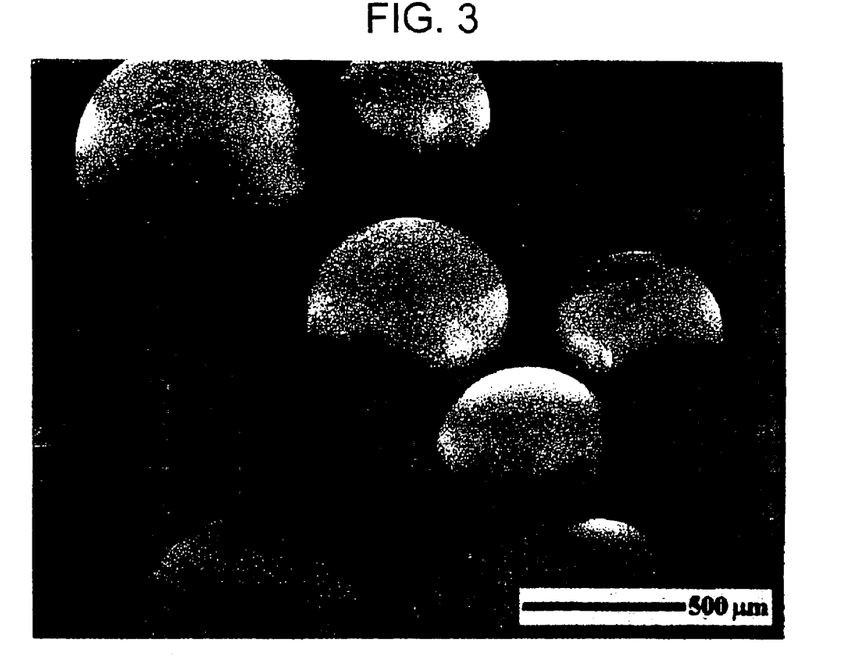
FIG. 3 and FIG. 4 show SEM micrographs, at two different magnifications, of spherical particles of the molecular sieve Silicalite 1 of Example 3.
Figure 4:
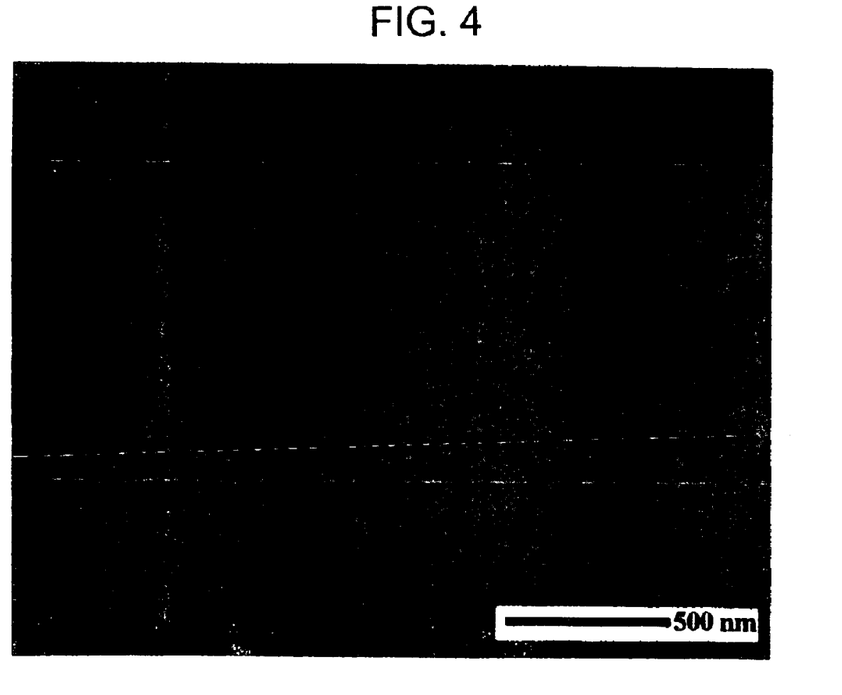
Figure 5:
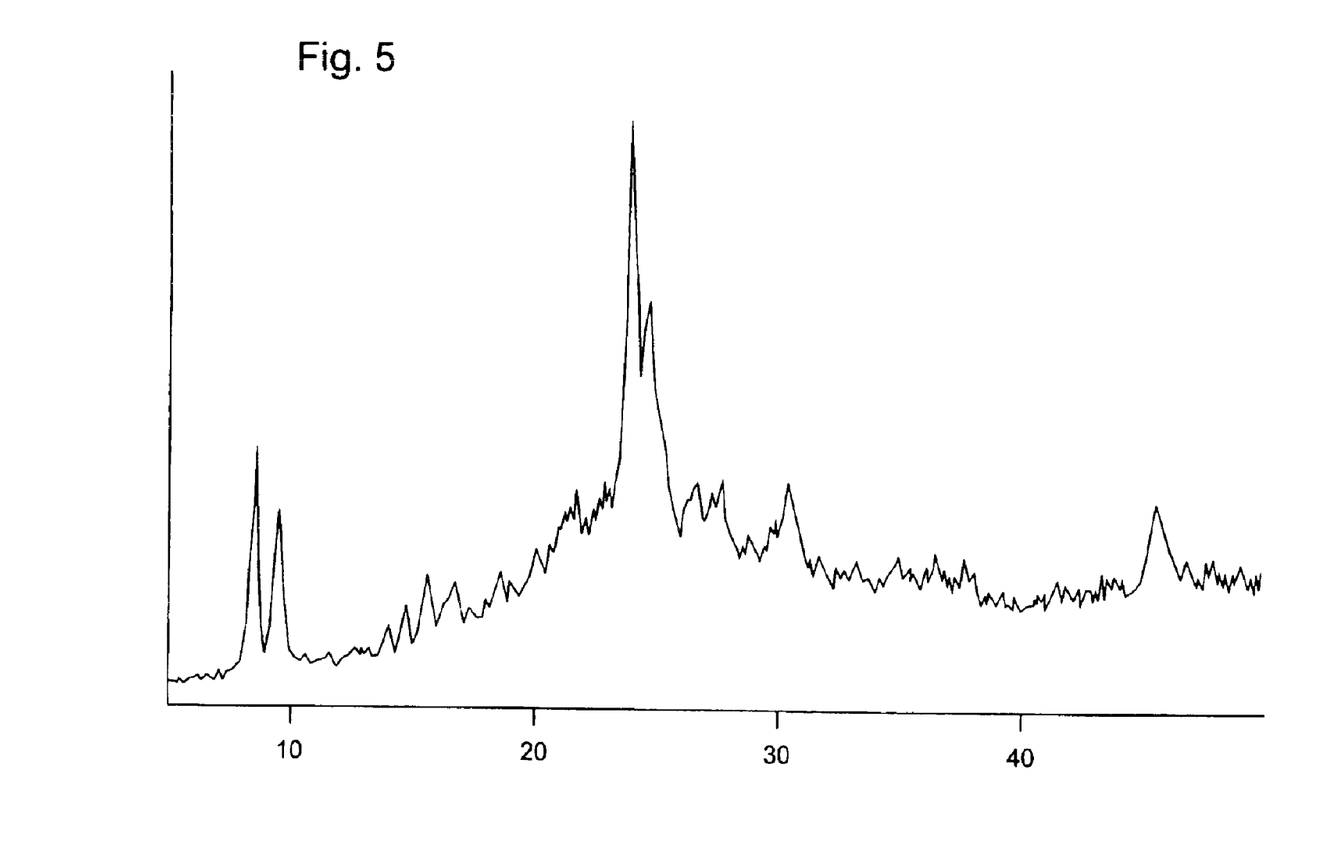
FIG. 5 represents an X-ray diffraction pattern for spherical particles of the molecular sieve Silicalite 1 of Example 3.

Visual inspection and scanning electron microscopy revealed that the resulting material consisted of very hard, solid (homogeneous), white spherical particles with a size distribution identical to that in the employed ion exchanger. The primary particles making up the spheres had a size of about 100 nm. Also, the primary particles on the surface of the spheres was similar to the particles in the interior of the spheres. Elemental analysis showed that the particles were almost entirely free of carbon, hydrogen and nitrogen, which showed that the ion exchanger material was fully eliminated in the calcining stage. FIGS. 3 and 4 are two SEM photographs of the material taken at two different magnifications. FIG. 3 taken at the lower magnification shows the spherical character of the particles, whereas FIG. 4 taken at high magnification shows the presence of small primary particles (primary crystals) with a size of about 100 nm. X-ray diffractometry revealed that the material is crystalline and consists of Silicalite 1, but that it also contains a percentage of amorphous material. An X-ray diffraction pattern for this sample is shown in FIG. 5. Analysis with nitrogen adsorption gave a specific surface area of 438 m$^2$/g and showed that most of the pore volume was found in micropores with an average pore diameter of 6 Å, calculated according to the Horvath-Kawazoes method.

Silicalite 1 was prepared using the same procedures as described above, except that the hydrothermal treatment was carried out at different temperatures.

In the first Silicalite 1 preparation, the hydrothermal treatment temperature was 165° C. Scanning electron microscopy showed that the surface of the spheres of the resulting product were overlaid with crystals of MFI-type zeolite and had a size up to 500 nm. The inner part of the spheres was less homogeneous and agglomerates of small particles could be distinguished.

In the second preparation, the hydrothermal treatment was carried out in two steps. The temperature of the first step was 100° C. and the temperature of the second step was at 165° C. The resulting spheres were highly crystalline which indicates that the degree of crystallinity can be increased by a second hydrothermal treatment at a higher temperature.

EXAMPLE 4

Macrostructures comprising spherical particles of ZSM-5 were prepared as follows:

15 grams of a synthesis solution with the molar composition: 0.35 $Na_2O$:9TPAOH:0.25$Al_2O_3$:25 $SiO_2$:405 $H_2O$ were added to 1.0 grams of a macroporous strongly basic anion exchanger sold under the tradename Dowex MSA-1 and manufactured by the Dow Chemical Company (particle size 20–50 mesh [dry]; ion exchange capacity: 4 mEq/g). The synthesis mixture was prepared by first dissolving 0.408 grams of aluminum isopropoxide in 10 grams of 1.0M tetrapropylammonium hydroxide. Another solution was prepared by dissolving 6.0 grams freeze-dried silica sol (Bindzil 30/220, 31 wt % $SiO_2$, 0.5 wt % $Na_2O$ Eka Chemicals, AB) in 26 grams 1.0M TPAOH at 100° C. The two solutions were mixed under agitation for 30 minutes. The mixture of ion exchanger and synthesis solution was heated in a polyethylene reactor equipped with a reflux condenser in an oil bath at 100° C. for 20 days. After this time, the ion exchanger particles were separated from the solution and the material was crystallized in the bulk phase by filtration and treated in a 0.1M ammonia solution in an ultrasound bath for 15 minutes, and then separated again by filtration. Next, the particles were washed three times by suspension in distilled water, followed by separation by filtration, and then dried in a heating cabinet at 60° C. for 12 hours. Next, the particles were calcined at 600° C. in air for 10 hours, after heating to this temperature at a rate of 1° C./min.

Visual inspection and analysis with a scanning electron microscope showed that the product largely consisted of white, solid particles with a size and shape identical to that of the employed ion exchanger. A relatively large fraction of the product, however, was shown to consist of particles with roughly the same size as the employed ion exchanger, but with a more irregular shape. SEM analysis at high magnification showed that the particles consisted of intergrown crystals with a morphology typical of MFI structures and with a size of about 1 μm. X-ray diffractometry showed that the particles consisted of zeolite ZSM-5 and a relatively large fraction of amorphous material. The specific surface area was measured by nitrogen adsorption at 612 $m^2/g$.

EXAMPLE 5

Macrostructures comprising spherical particles of zeolite A were prepared as follows:

18.0 grams of a synthesis solution with the molar composition: 0.22 $Na_2O$:5.0 $SiO_2$:$Al_2O_3$:8 $TMA_2O$:/400 $H_2O$ were added to 1.0 grams of a strongly basic anion exchanger sold under the tradename Dowex MSA-1 and manufactured by the Dow Chemical Company. The synthesis mixture was prepared by first dissolving 1.25 grams of aluminum isopropoxide and 9.0 grams tetramethylammonium hydroxide pentahydrate in 0.90 grams of 1.0M solution of NaOH and 3.0 grams water under agitation for 2 hours. This solution was added to a mixture of 3.0 grams silica sol (Bindzil 30/220, 31 wt % $SiO_2$, 0.5 wt % $Na_2O$ Eka Chemicals, AB) and 12 grams of distilled water and the resulting solution was agitated for 3 hours. The mixture of ion exchanger and synthesis solution was heated in a polyethylene reactor equipped with a reflux condenser in an oil bath at 100° C. for 10 hours. After this time, the ion exchanger particles were separated from the solution and the material was crystallized in the bulk phase by filtration and treated in a 0.1M ammonia solution in an ultrasound bath for 15 minutes, and then separated again by filtration. Next, the particles were washed three times by suspension in distilled water, followed by separation by filtration, and then dried in a heating cabinet at 60° C. for 12 hours. Next, the particles were calcined at 600° C. in air for 10 hours, after heating to this temperature at a rate of 1° C./min.

Visual inspection and analysis by scanning electron microscopy showed that the product largely consisted of light brown, solid particles. The size of the particles was smaller than the employed ion exchanger. A smaller fraction of the product consisted of fragmented particles. SEM at high magnification showed that the particles are homogeneous and are constructed from intergrown primary particles with a size up to about 300 nm. X-ray diffractometry showed that the resulting material contained zeolite A and a certain amount of amorphous material. Nitrogen adsorption measurements gave a specific surface area (according to the BET equation) of 306 $m^2/g$ and indicated the presence of both micro- and mesoporosity.

EXAMPLE 6

Macrostructures comprising spherical particles of zeolite Beta were prepared as follows:

15 grams of a synthesis solution with the molar composition: 0.35 $Na_2O$:9TEAOH:0.5$Al_2O_3$:25 $SiO_2$:295 $H_2O$ were added to 1.0 grams of a strongly basic anion exchanger sold under the tradename Dowex MSA-1 and manufactured by the Dow Chemical Company. The synthesis mixture was prepared by dissolving 0.81 grams aluminum isopropoxide in 6.0 grams tetraethylammonium hydroxide (TEAOH, 20% solution) at 100° C. This solution was added to a solution of 6.0 grams freeze-dried silica sol (Bindzil 30/220, 31 wt % $SiO_2$, 0.5 wt % $Na_2O$ Eka Chemicals, AB) dissolved in 20 grams of TEAOH (20% solution) and the resulting solution was agitated for 30 minutes. The mixture of ion exchanger and synthesis solution was heated in a polyethylene reactor equipped with a reflux condenser in an oil bath at 100° C. for 8 days. After this time, the ion exchanger particles were separated from the solution and the material was crystallized in the bulk phase by filtration and treated in a 0.1M ammonia solution in an ultrasound bath for 15 minutes, whereupon the particles were separated again by filtration. The particles were finally washed three times by suspension in distilled water, followed by separation by filtration, and then dried in a heating cabinet at 60° C. for 12 hours. Next, the particles were calcined at 600° C. in air for 10 hours, after heating to this temperature at a rate of 1° C./min.

Visual inspection, as well as analysis with a scanning electron microscope, showed that the product largely consisted of hard, white, solid particles with a size and shape identical to that of the employed ion exchanger. SEM analysis at high magnification shows that the material is constructed of intergrown primary particles with a size of about 80 nm. X-ray diffractometry showed that the particles contained zeolite Beta as the only crystalline phase. The specific surface area calculated with the BET equation, based on nitrogen adsorption data, was 580 $m^2/g$.

EXAMPLE 7

A film of Silicalite 1 was built upon the surface of a macrostructure of Silicalite 1 produced according to Example 3 as follows:

10.0 grams of synthesis solution with the composition and preparation according to Example 3 were added to 0.20 grams of calcined product produced according to Example 3. This mixture was heated at 100° C. in a polyethylene reactor equipped with a reflux condenser for 48 hours. After this time, the particles were separated from the solution and the material was crystallized in the bulk phase by filtration and treated in a 0.1M ammonia solution in an ultrasound bath for 15 minutes, whereupon they were separated again by filtration. The particles were finally washed three times by suspension in distilled water, followed by separation by filtration, and then dried in a heating cabinet at 60° C. for 12 hours. Part of the material was calcined at 600° C. for 10 hours, after heating to this temperature at a rate of 1° C./min. X-ray diffraction measurements on the calcined sample revealed that the sample contained Silicalite 1 as the only crystalline phase. Scanning electron microscopy detected an outer layer of Silicalite 1 on the surface of the particles, a layer that synthesis had built up from about 300/-nm large primary particles. The specific surface area was determined for the uncalcined sample as 92 $m^2/g$, whereas the corresponding value measured for the calcined sample was 543 $m^2/g$. The difference in the surface before and after calcining indicates that the outer shell of Silicalite 1 effectively encloses the open pore system in the original particles.

What is claimed is:

1. A process of preparing composite material comprising a porous organic ion exchanger and porous inorganic material comprising:
   (a) providing an admixture comprising said porous organic ion exchanger and a synthesis mixture which is capable of forming said porous inorganic material and which occupies at least a portion of the pore space of said porous organic ion exchanger; and
   (b) converting said synthesis mixture within the pore space of said porous organic ion exchanger to form said porous inorganic material.

2. The process recited in claim 1, further comprising the step of removing said porous organic ion exchanger from said composite material to obtain macrostructures of said porous inorganic material.

3. The process recited in claim 2, wherein said macrostructures have the size and shape of said porous organic ion exchanger.

4. The process recited in claim 2, wherein said macrostructures have at least one dimension greater than about 0.1 mm.

5. The process recited in claim 2, wherein said macrostructures are spherical or cylindrical.

6. The process recited in claim 2, wherein said porous organic ion exchanger is removed by either an oxidation process or by dissolution.

7. The process recited in claim 2, wherein said porous inorganic material is mesoporous inorganic material.

8. The process recited in claim 7, wherein said mesoporous inorganic material is selected from the group consisting of silica, aluminum silicate, and alumina.

9. The process recited in claim 8, wherein the mesoporous inorganic material is amorphous silica or amorphous silica-alumina having a specific surface area exceeding 200 $m^2/g$.

10. The process recited in claim 2, wherein said porous organic ion exchanger is a porous organic anionic ion exchanger.

11. The process recited in claim 10, wherein said porous organic anionic ion exchanger is a polymer-based.

12. The process recited in claim 11, wherein said porous organic anionic ion exchanger is a macroreticular ion exchanger.

13. The process recited in claim 10, wherein said porous inorganic material is comprised of microporous molecular sieve.

14. The process recited in claim 13, wherein seeds in said synthesis mixture grow to form said porous inorganic material.

15. The process recited in claim 14, wherein said seeds are added to said synthesis mixture.

16. The process recited in claim 14, wherein said seeds are either formed within the pores of said porous organic ion exchanger or are introduced into said porous organic ion exchanger by either ion exchange or adsorption.

17. The process recited in claim 14, wherein said seeds are oligomeric anions of silicates or crystals of a molecular sieve having a size of less than 200 nm.

18. The process recited in claim 14, wherein said porous organic ion exchanger has an ion-exchange capacity greater than about 1 meg./gm of dry porous organic ion exchanger.

19. The process recited in claim 14, wherein said microporous molecular sieve is a large pore size molecular sieve or an intermediate pore size molecular sieve.

20. The process recited in claim 19, wherein the structure type of said molecular sieve is selected from the group consisting of LTL, FAU, MOR, *BEA, MFI, MEL, MTW, MTT, MFS, FER, and TON.

21. The process recited in claim 20, wherein said porous organic ion-exchanger is a strongly basic anion-exchange resin containing quartenary ammonium groups.

22. The process recited in claim 13, wherein said microporous molecular sieve is ALPO-based molecular sieve.

23. The process recited in claim 13, wherein said microporous molecular sieve is an aluminosilicate zeolite or a metallo-silicate substantially free of aluminum.

24. The process recited in claim 23, wherein said molecular sieve is selected from the group consisting of zeolite A, zeolite L, zeolite X, zeolite Y, mordenite, zeolite beta, ZSM-5, ZSM-11, ZSM-22, silicalite 1 and silicalite 2.

25. The process recited in claim 13, wherein said microporous molecular sieve has a MFI structure type which is prepared from an aqueous synthesis composition having the following composition in mole ratios of oxides:

| | |
|---|---|
| $M_2O:SiO_2$ | 0 to 0.7 to :1 |
| $SiO_2:Al_2O_3$ | 12 to infinity :1 |
| $R:SiO_2$ | 0 to 0.2:1 |
| $H_2O:SiO_2$ | 7 to 1000:1 | wherein R is a directing agent and M is an alkali metal;
   (b) converting said synthesis mixture under hydrothermal conditions to form said microporous molecular sieve; and,
   (c) removing said porous organic ion exchanger.

26. The process recited in claim 25, wherein said hydrothermal conditions comprise an initial temperature greater than 90° C. and final temperature greater than the first temperature.

27. The process recited in claim 13, wherein said microporous molecular sieve is a ZSM-5 or silicalite 1.

28. The process recited in claim 13, wherein the synthesis mixture is a silicate, an aluminosilicate, or a metallosilicate solution.

29. The process recited in claim 13, wherein the synthesis mixture has a mixture which upon hydrothermal treatment in the absence of an organic ion-exchange resin results in the crystallization of said porous inorganic material.

* * * * *